(12) United States Patent
Charara et al.

(10) Patent No.: US 9,250,346 B2
(45) Date of Patent: Feb. 2, 2016

(54) METHOD FOR DETERMINING GEOMETRIC CHARACTERISTICS OF A HYDRAULIC FRACTURE

(75) Inventors: Marwan Charara, Moscow (RU); Maxim Chertov, Salt Lake City, UT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 511 days.

(21) Appl. No.: 13/468,893

(22) Filed: May 10, 2012

(65) Prior Publication Data

US 2012/0305242 A1 Dec. 6, 2012

(30) Foreign Application Priority Data

May 31, 2011 (RU) .................. 2011121930

(51) Int. Cl.
*G01V 1/22* (2006.01)
*G01V 1/28* (2006.01)
*G06F 19/00* (2011.01)
*G01V 1/42* (2006.01)
*G01V 1/30* (2006.01)

(52) U.S. Cl.
CPC *G01V 1/42* (2013.01); *G01V 1/284* (2013.01); *G01V 1/301* (2013.01); *G01V 2210/646* (2013.01)

(58) Field of Classification Search
CPC ......... G01V 1/284; G01V 1/301; G01V 1/42; G01V 2210/646; G01V 1/00
USPC ........... 702/13, 14, 18; 367/37, 38; 73/152.02
See application file for complete search history.

(56) References Cited

U.S. PATENT DOCUMENTS

| 4,282,587 A | 8/1981 | Silverman |
| 5,574,218 A | 11/1996 | Withers |
| 6,985,816 B2 | 1/2006 | Sorrells et al. |

(Continued)

FOREIGN PATENT DOCUMENTS

| EA | 005350 | 2/2005 |
| EP | 0176410 | 4/1986 |
| EP | 2065556 | 6/2009 |

(Continued)

OTHER PUBLICATIONS

Search Report of British Application No. GB1117050.3 dated Nov. 23, 2011: p. 1.

(Continued)

*Primary Examiner* — John H Le

(57) ABSTRACT

Method for determining geometric characteristics of a hydraulic fracture includes performing a baseline seismic survey for a geological formation. A velocity model is created by combining results of the baseline seismic survey and additional geoscientific information, and seismic properties of the geologic formation are evaluated. At least one strong flat lithological reflector disposed below a planned fracture is identified. A numerical model of elastic wave propagation in the geologic formation with a fracture with given properties is created. Hydraulic fracturing is performed and after fracturing when the fracture is maintained open and pressurized seismic surveys are performed. The fracture's dimensions and shape are determined by comparing the first and the second reflected and refracted seismic signals and solving an inverse problem with the use of the numerical model.

7 Claims, 1 Drawing Sheet

(56) References Cited

U.S. PATENT DOCUMENTS

2011/0188347 A1* 8/2011 Thiercelin et al. ............... 367/38
2012/0305242 A1 12/2012 Charara et al.

FOREIGN PATENT DOCUMENTS

| | | |
|---|---|---|
| GB | 2451560 | 2/2009 |
| GB | 2466438 | 6/2010 |
| RU | 2143064 | 12/1999 |
| RU | 2290507 | 12/2006 |
| RU | 2301886 | 6/2007 |
| RU | 2370791 | 10/2009 |
| RU | 2394985 | 7/2010 |
| WO | 9623957 | 8/1996 |
| WO | 9904292 | 1/1999 |
| WO | 2005035943 | 4/2005 |

OTHER PUBLICATIONS

Chekaluyk, "Oil Stratum Thermodynamics," NEDRA Publishing: Moscow, 1965: p. 67.

Cheremensy, "Applied Geothermics," NEDRA Publishing: Lenngrad, 1977: pp. 181-182.

Extended European Search Report of European Application No. 12250117.4 dated Jul. 28, 2014: pp. 1-4.

Meadows et al., "Seismic detection of a hydraulic fracture from shear-wave VSP data at Lost Hills Field, California," Geophysics, Jan. 1994, vol. 59(1): pp. 11-26.

* cited by examiner

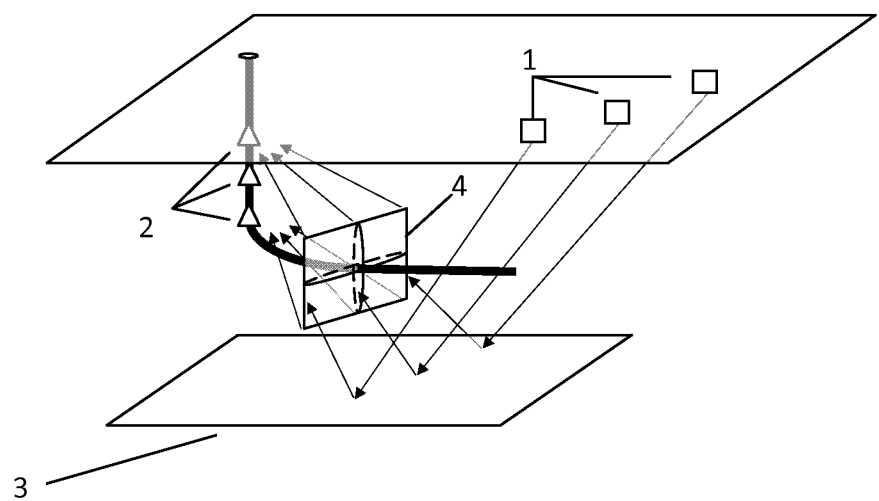

METHOD FOR DETERMINING GEOMETRIC CHARACTERISTICS OF A HYDRAULIC FRACTURE

CROSS-REFERENCE TO RELATED APPLICATION

This application claims priority to Russian Patent Application Serial No. RU 2011121930 filed May 31, 2012, which is incorporated herein by reference in its entirety.

FIELD OF THE DISCLOSURE

The invention is related to the methods for monitoring formation hydraulic fractures and, particularly, to the determination of geometrical characteristics of fractures resulting from the rock hydraulic fracturing, and may be applied in oil and gas fields.

BACKGROUND OF THE DISCLOSURE

Formation hydraulic fracturing is a well-known method for enhancing hydrocarbons' production from a well by means of fracture generation. A high-viscosity fluid, also referred to as the hydraulic fracturing fluid containing a propping agent (proppant) is injected into a formation to create a fracture in the production interval and fill the fracture with the proppant. For the efficient use the fracture must be located inside the production interval and must not protrude into the adjacent strata as well as be of sufficient length and width. Therefore, obtaining reliable information about hydraulic fractures is, therefore, crucial for optimizing their design and efficient planning of the fields operation.

Nowadays the geometry of fractures is determined using various technologies and methods. Most wide-known are passive seismic methods (the so-called hydraulic fracture visualization) ensuring the evaluation of the spatial orientation of a fracture and its length during the hydraulic fracture activities and based on recording and locating of micro-seismic events generated by cracking of the rock near the edges of propagating fracture. The shape characterization has some intrinsic uncertainty, because the scatter of natural microseismic events around the fractured zone can be large compared to typical fracture width. The method does not always work: due to low emission amplitudes or high attenuation registered signal may be low compared to a noise level. Hydraulic fracture monitoring activities using passive seismics methods are very seriously restricted by the fact that they require a second observation well located within reasonably small distance from the main treatment well. Small distance is required to ensure registration of relatively weak microseimic events, whose amplitude mostly depends on in-situ properties and state of the rock and is out of operator's control. The second well is required, because it is difficult to deploy acquisition string simultaneously with the hydraulic fracturing treatment involving high pressure pumping, which may be very noisy.

Hydraulic fracture seismics using an active seismic source are also known. They may provide a higher (compared with the passive seismics methods) amplitude of the registered useful signal. Thus, U.S. Pat. No. 5,574,218 suggests a method for determining a length and an azimuth of a hydraulic fracture after it has been formed without the need for positioning sensors at subsurface locations by performing two or more subsequent surface seismic acquisitions. The method comprises performing a baseline seismic survey to determine a seismic response of the undisturbed formation followed by one or more seismic surveys when the fracture is still open and under pressure; studying the differences in seismic responses enables to determine the fracture length and azimuth. A seismic source and seismic receivers' array are positioned at substantially equal distances from the treatment well with this distance being equal to approximately one-half of the depth of the layer to be fractured. The method described is not efficient for hydraulic fracture characterization, because, apparently, it aims at registration of the differential signal diffracted from the fracture in upward direction, which will have small amplitude.

In WO 99/04292, it is suggested to detect horizontal and vertical edges of a fracture by identifying a boundary between unaffected and shadowed direct raypaths, when acquisition string and a source are on the opposite sides of the open hydraulic fracture and by distinguishing the raypaths reflected from the fracture from raypaths transmitted in the reservoir on the same side from the fractures as the seismic source. In both cases the detection of the fracture edges is done by detecting absence or presence of an S-component signal completely shadowed or reflected by the open fluid-filled fracture. This method is aimed at the detection of the strongest component of the seismic disturbance introduced by the hydraulic fracture when it is maintained in open condition, this disturbance is the share shadowing by the fracture due to zero elastic shear modulus in the fracture fluid. The described method has very high requirements to the field development diagram and plan, especially as far as the well trajectory is concerned. The method requires several dedicated observation wells, preferably, located within 100 m distance from the treatment well which need to be stopped from production during the survey; to detect shadowed or reflected rays the seismic sensors should be positioned below the fracture. Finding such wells occasionally has quite low chance for success, it is more likely that getting such wells would require costly dedicated drilling program, because typically wells are not drilled far below the production depth.

SUMMARY OF THE DISCLOSURE

The invention provides for improved reliability, accuracy and efficiency of a fracture dimensions' determination accompanied by making this procedure simpler due to the possibility of using the same well in which the hydraulic fracturing is performed and to reduced restrictions imposed by the landscape features.

Method for determining geometric characteristics of a hydraulic fracture comprises performing a baseline seismic survey for a geological formation, the survey includes excitation of first seismic signals by at least one seismic source and registration of first reflected and refracted seismic signals by at least one seismic receiver. A velocity model is created by combining results of the baseline seismic survey and additional geoscientific information, and seismic properties of the geologic formation are evaluated. At least one strong flat lithological reflector disposed below a planned fracture is identified using the velocity model. A numerical model of elastic wave propagation in the geologic formation with a fracture with given properties is created. Position of the seismic sources and receivers and their properties are optimized on the basis of the numerical model taking into account the depth of the identified reflector, geometry and position of the planned fracture. Hydraulic fracturing is performed and after fracturing when the fracture is maintained open and pressurized seismic surveys are performed, the surveys include excitation of second seismic signals by at least one seismic source and registration of second reflected and refracted seismic signals by at least one seismic receiver. The fracture's dimensions and shape are determined by comparing the first and the second reflected and refracted seismic signals and solving an inverse problem with the use of the numerical model.

BRIEF DESCRIPTION OF THE FIGURES

FIG. 1 illustrates an example method for determining geometrics characteristics of a hydraulic fracture in accordance with one embodiment.

DETAILED DESCRIPTION

By using natural lithological reflectors underlying induced hydraulic fractures, by combining various sets of surface and downhole seismic sources and receivers with optimized positioning in accordance with relative location of reflectors and treatment zone to maximize informative differential measurement of shear wave shadowing and shear wave splitting, which is obtained by subtracting seismic response before fracturing and during fracturing or immediately after pumping is stopped and fluid filled fracture is maintained open, one can efficiently convert the acquired seismic response of an induced fracture to the useful information about the fracture dimensions and shape. By combining the aforesaid elements one can greatly reduce requirements to trajectories of monitoring wells and even perform characterization of fractures using only one treatment well; alleviate constraints imposed by landscape features.

The proposed method of a fracture geometry determination using an active seismic source enables to obtain information about the dimensions and shape of an open fluid filled hydraulic fracture during and after the treatment, which is much less restrictive to parameters of observation wells than other known methods. The method is based on identification of one or more strong and flat seismic reflectors below the fractured zone, redirecting considerable amount of down-going seismic energy in the upgoing shear components of seismic wavefield, which can be further shadowed due to presence of fracture. Horizontally stratified, layered geological media is a typical situation observed in sedmentary basins and there is good chance to find a boundary between layers with suitable reflectivity. The suggested method is more geology dependent than other seismic methods for fracture characterization, because it needs to have strong reflector below the fracture, but it is more flexible concerning well trajectories.

In case of a horizontal well, the acquisition can be performed from the same treatment well, as shown in FIG. 1, where 1—seismic sources, 2—seismic receivers, 3—a lithological reflector, 4—a formation hydraulic fracture. The possibility to perform fracturing treatment and fracture characterization using only single well is extremely important for economics of field operations, especially offshore ones.

The features of the method are: an accurate velocity model, a baseline survey, optimization of survey plan with account for depth of a target reflector, focusing to register shadowing of unconverted reflected SH modes, or of reflected and converted P-SV modes, or both, with multiple recording arrays. Survey design may be optimized to register the shadowing of a seismic field reflected from more than one strong target reflector.

Before the hydraulic fracturing a preliminary seismic survey for a geological formation is performed, the survey includes excitation of first seismic signals by at least one seismic source and registration of first reflected and refracted seismic signals by at least one seismic receiver. An accurate velocity model is created (spatial distribution of elastic waves in the formation) by combining the preliminary seismic survey results, logging data, well seismic survey data, core survey data and other geological information required to build the velocity model.

Seismic characteristics of the geological formation are evaluated, particularly, the accuracy and spatial resolution of the velocity model, rock signal attenuation value to evaluate feasibility of further steps for fracture characterization in this specific formation based on the sufficiently high resolution of the velocity model and low attenuation of the seismic waves.

Based on the velocity model at least one strong and flat lithological reflector located below the planned fracture is identified as the interface with high contrasts of the acoustic impedance including its depth, inclination, reflectivity to be used to redirect seismic energy to receiver arrays.

Forward numerical modeling of the elastic waves' propagation in the formation with the fracture having preset properties is performed to optimize the survey plan so that to maximize the recorded effect of shear shadowing and shear splitting of transverse waves' SH-components (horizontal polarization of the elastic transverse waves), SV-components (vertical polarization of the elastic transverse waves) converted from longitudinal waves at seismic interfaces or combination of both of these components. The positioning of seismic sources and receivers and their properties are optimized based on the depth of the identified lithological reflector, geometry and location of the planned fracture.

Soon after the fracture pumping has stopped when the fracture is maintained open and pressurized a seismic survey is performed. One or more sequential seismic surveys may be performed during the fracture treatment at different stages of its growth. The recorded seismic wave field of the baseline survey is subtracted from the results recorded after the hydraulic fracturing to obtain differential seismic response of the fracture at different stages.

A series of numerical calculations is performed modeling the propagation of the seismic waves in case of presence of the hydraulic fracture with different combinations of geometrical characteristics (shape, dimensions) in order to solve an inverse problem and determine the fracture geometry that in the best way corresponds to the recorded seismic response.

What is claimed:

1. A method for determining geometric characteristics of a hydraulic fracture comprising:
    performing a baseline seismic survey for a geological formation the baseline seismic survey is performed by excitation of first seismic signals by at least one seismic source and registration of first reflected and refracted seismic signals by at least one seismic receiver,
    creating a velocity model by combining results of the baseline seismic survey and an additional geoscientific information using a computer processor,
    evaluating seismic properties of the geologic formation by the computer processor,
    identifying by the computer processor at least one strong flat lithological reflector disposed below a planned fracture using the created velocity model,
    creating by the computer processor a numerical model of elastic wave propagation in the geologic formation with a fracture with given properties,
    optimizing position of the seismic sources and receivers and their properties on the basis of the numerical model taking into account the depth of the identified reflector, geometry and position of the planned fracture,
    performing hydraulic fracturing,
    performing at least one seismic survey after fracturing when the fracture is maintained open and pressurized, the at least one seismic survey is performed by excitation of second seismic signals by at least one seismic source and registration of second reflected and refracted seismic signals by at least one seismic receiver, and determining the fracture's dimensions and shape by comparing the first and the second reflected and refracted seismic signals and solving an inverse problem by the computer processor with the use of the numerical model.

2. The method of claim 1 wherein log data, or borehole seismic data, or a core sample research results or combination thereof are used as the additional geoscientific information.

3. The method of claim 1, wherein the seismic properties of the geologic formation comprise accuracy and spatial resolution of the velocity model and rock attenuation.

4. The method of claim 1, wherein the lithological reflector is identified as interfaces in the velocity model with high contrasts of acoustic impedance, including their depths, dips, reflectivity.

5. The method of claim 1, wherein at least one additional seismic survey is performed during the fracture formation at different stages of fracture growth.

6. The method of claim 1, wherein the seismic sources and receivers are disposed at a level of ground surface.

7. The method of claim 1, wherein the seismic sources and receivers are disposed below ground surface.

* * * * *